Sept. 26, 1961   A. J. SCHLANGEN   3,002,186
OIL GAUGE

Filed April 14, 1958   2 Sheets-Sheet 1

Alphonse J. Schlangen
INVENTOR.

BY

Sept. 26, 1961 A. J. SCHLANGEN 3,002,186
OIL GAUGE

Filed April 14, 1958 2 Sheets-Sheet 2

Alphonse J. Schlangen
INVENTOR.

BY
Attorneys

3,002,186
OIL GAUGE
Alphonse J. Schlangen, Box 37, Oak Park, Minn.
Filed Apr. 14, 1958, Ser. No. 728,379
5 Claims. (Cl. 340—244)

This invention relates to signal devices and more particularly to a device for continually signaling the quantity of oil in a power plant.

The invention entails a continually operative signal system having an auxiliary reservoir of oil, for example crankcase engine oil, automatic transmission oil etc., together with a float operated switch whose positions are signaled by energizing an electric lamp that responds to the position of the float. A feature of the invention is a direct visual indicator that is especially useful for service attendants, mechanics, etc., when working in, on or around the engine or transmission of the motor vehicle.

One of the important features of the invention is its mechanical simplicity and its certainty in operation. An oil gauge constructed in accordance with the invention is very dependable having few moving parts none of which will ordinarily become defective throughout the useful life of the motor vehicle.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
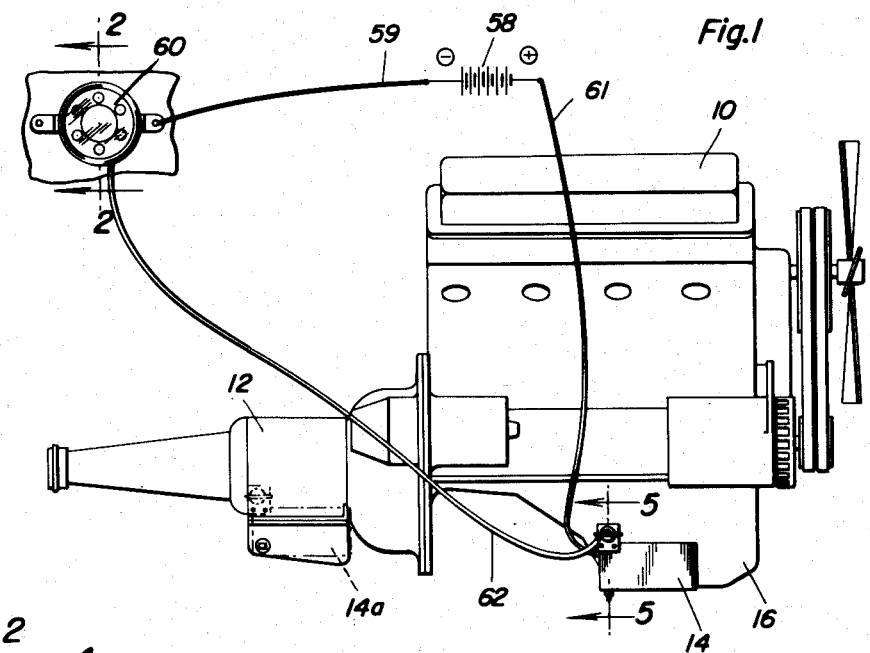
FIGURE 1 is a side view of an engine fitted with a gauge constructed in accordance with the invention.

In the accompanying drawings there is an engine 10 which schematically represents any kind of engine especially useful for motor vehicles of the type which operate over land but which may be any other type of engine. The engine has as a part of the power train, a conventional transmission 12. As shown in dotted lines, the receptacle 14a can be applied to the transmission case. The identical receptacle 14 is shown in detail and is shown attached to the engine pan 16. Receptacle 14 constitutes an auxiliary reservoir and may be of any shape. For the purposes of illustration receptacle 14 is shown as a rectangular enclosure having two elongate side walls 18 and 19, bottom wall 20, a top wall 21 and two end walls 22 and 23 respectively. All walls are joined together at their edges and two mounting brackets 24 and 25 are attached to the end walls 22 and 23. The mounting brackets are adapted to be fastened to a convenient part within the engine compartment of the motor vehicle and this part will vary in accordance with manufacturers' makes of motor vehicles. In fact, the brackets could be attached to the pan 16. Drain plug 26 is in the bottom wall 20 of receptacle 14, and the oil inlet passageway 28 is constituted by the bore of a short sleeve 29 welded in an opening in wall 18 of receptacle 14 and passed into a hole 30 in crankcase 16 near the bottom thereof. A compressible bushing 34 is placed on the sleeve 29 and is located between the wall of the pan 16 and wall 18 of receptacle 14.

Figure 5:
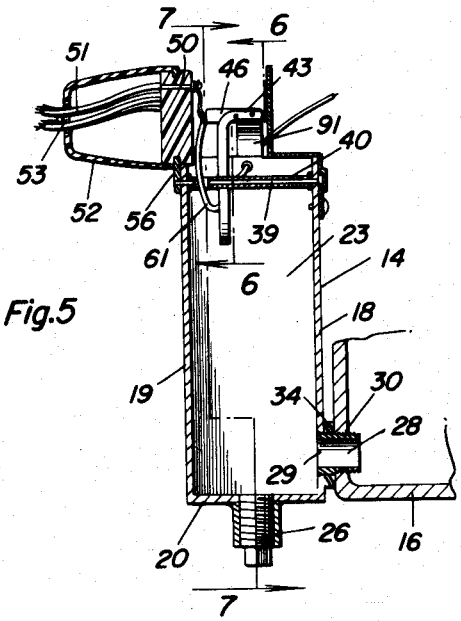
FIGURE 5 is a longitudinal sectional view taken on the line 5—5 of FIGURE 1.
Figure 6:
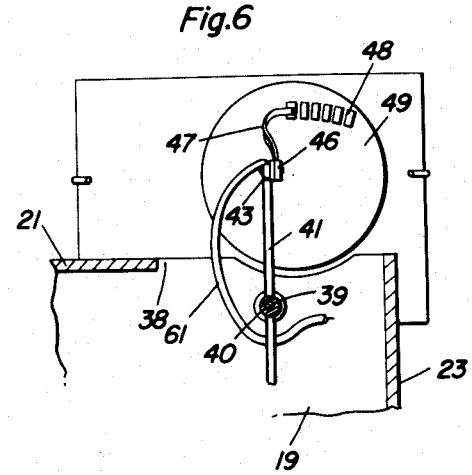
FIGURE 6 is a sectional view taken on the line 6—6 of FIGURE 5 and showing a part of the switch and float construction.
Figure 7:
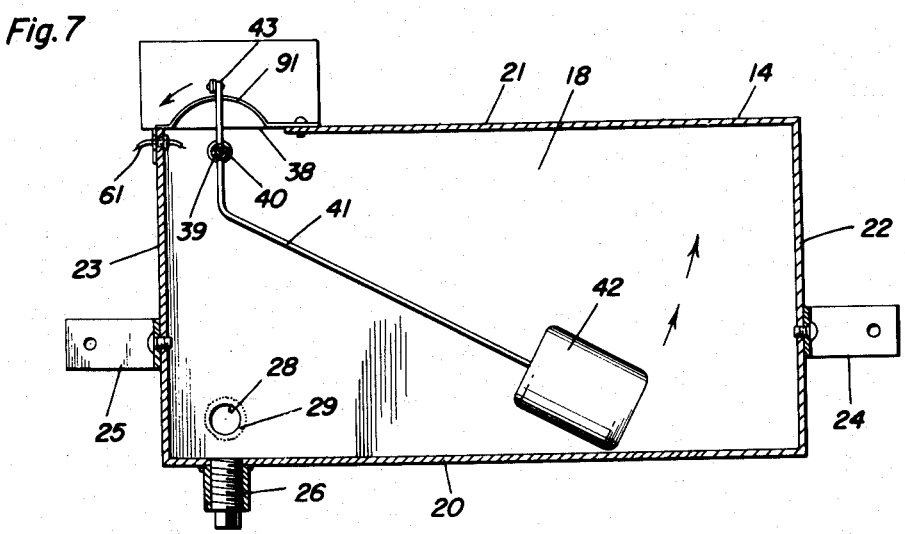
FIGURE 7 is a sectional view taken on the line 7—7 of FIGURE 5.

There is an opening 38 in wall 21 between which transverse spindle 39 extends. An oscillatory sleeve 40 is mounted on spindle 39 and has float arm 41 fixed to it. The extremity of the float arm has a float 42 which is operable in the receptacle 14 to sense the liquid level in it. The opposite end of float arm 41 has a part 43 which protrudes laterally and to which electrically insulating wafers 46 are fastened. A spring metal contact 47 is secured between the wafers 46 and has an end adapted to wipe across a group 48 of fixed contacts that are carried on insulating wall 49. Movable contact 47, therefore, constitutes a wiper to move over the group of fixed contacts. Each fixed contact has a binding post, for example binding post 50 (FIGURE 5) that passes through the electrically insulating wall 49. The extremity of the binding post has a wire 51 secured to it and is protected by being disposed within housing 52. The housing is snapped onto the peripheral part of the circular wall 49 and has an opening 53 through which a wiring harness or a group of separate wires 51, one for each contact 48 pass. A circular groove is in the periphery of wall 49 to receive a mounting bracket 56. This bracket is fixed to wall 19 of the receptacle 14 thereby supporting the group of contacts 48 in a position that opposes the wiper 47.

As shown in FIGURE 1 the source 58 of electrical energy has one side attached by conductor 59 to an instrument 60 and the other side attached by a conductor 61 to wiper 47. Wiring harness 62 extends from the group 48 of contacts to the six lamps sockets 68 in instrument 60. Each socket has a lamp 69 in the instrument and it becomes energized when a circuit is selected by wiper 47 coming into engagement with a selected fixed contact 48. The lamps can be color coated to show at a glance the oil level in the crankcase of the engine or in the transmission or in both. It is suggested that clear lights, green lights, amber lights, red lights, etc. be selected in accordance with the prorogative of the manufacturer.

Figure 2:
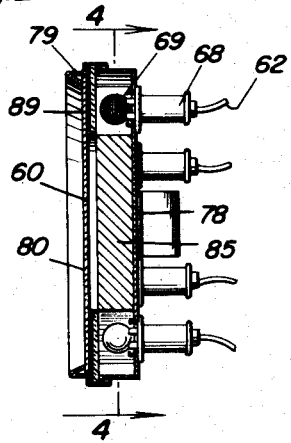
FIGURE 2 is an enlarged sectional view of the gauge instrument, and taken on the line 2—2 of FIGURE 1.
Figure 4:
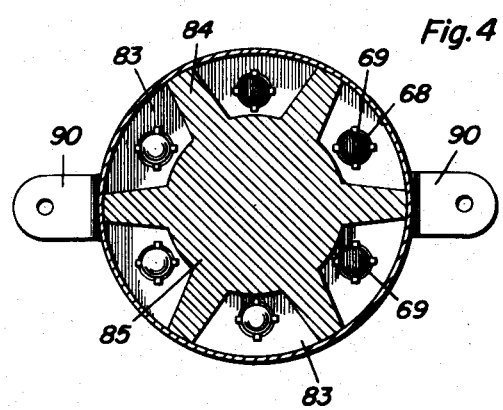
FIGURE 4 is a sectional view taken on line 4—4 of FIGURE 2.
Figure 3:
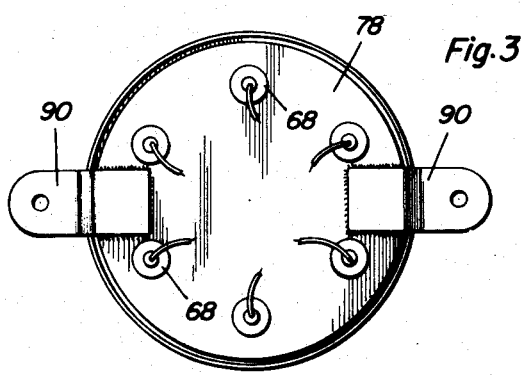
FIGURE 3 is a back view of the instrument in FIGURE 2.

Instrument 60 consists of a casing 78 with a rim 79 at its open front and supporting the transparent window 80 over six lamp pockets 83. Each pocket is separated by an arm 84 of base 85 that is disposed within the instrument case 78. Therefore, the light given by each lamp 69 is isolated from the adjacent lamp. Instead of having colored lights, small transparent or colored panels 89 with or without numerals can be placed over the pockets 83 (FIGURE 2), this being a suggested procedure. The sockets 68 and the lamps 69 are absolutely conventional both in their construction and manner of application in holes formed in the back wall of instrument case 78. Mounting ears or brackets 90 are attached to the case 78 of the instrument to hold it in place within the motor vehicle. This, too, may be varied.

Figure 8:
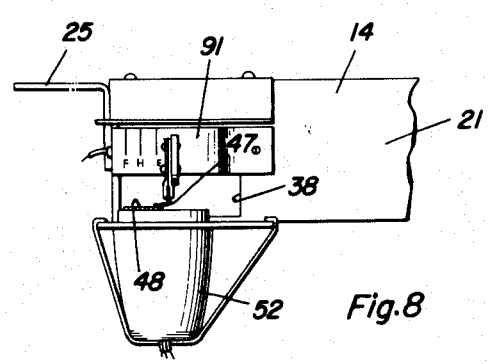
FIGURE 8 is a fragmentary top view of the auxiliary tank showing principally the direct reading gauge that is capable of being inspected from within the engine compartment.

As shown in FIGURE 8 a curved plate 91 is attached over the opening 38 in top wall 21 of receptacle 14. This has graduations, for example graduations which will indicate full, empty, half-full etc. The position of the part 43 of arm 41 and the wafers 46 with reference to the graduations on plate 91 will indicate at a glance the liquid level in receptacle 14, and this corresponds exactly to the liquid level in the crankcase 16, transmission 12, etc.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. A gauge to indicate the liquid level in a supply of liquid especially in an engine or transmission, said gauge comprising a receptacle that has means near the bottom thereof to register and communicate the interior of the receptacle with the interior of the liquid supporting device, a float arm, means mounting said float arm in said receptacle for oscillation, a wiper attached to said float arm, a group of stationary contacts, means supporting said stationary contacts adjacent to said wiper and in a position so that said wiper moves over and on said contacts, an electrical circuit within which said wiper and said group of stationary contacts are connected, an instrument in said circuit and actuated in response to movement of said wiper onto said contacts, said arm having an upper part, means including an insulated device attaching said wiper to said upper part of said arm, a graduation plate mounted adjacent to said upper part of said float arm and provided with a visually inspectable group of graduations adjacent to said part of said float arm and adapted to be referenced by said part of said float arm to provide a direct means of observing the fluid level condition in said receptacle, said means supporting said group of contacts comprising an insulating wall attached to said receptacle, said circuit including a group of circuit conductors attached individually to said fixed contacts and extending from said insulating wall, said instrument having a plurality of color coded lamps, an instrument case within which said lamps are supported, a base in said case and separating said case into a plurality of pockets, one of said lamps located in each pocket, and each of said circuit conductors connected to one of said lamps.

2. In combination, a portion of a motor vehicle power plant having an enclosure containing a liquid which is subjected to highly turbulent states during operation of the power plant, a gauge to indicate the liquid level in said portion of a power plant during power plant operation, said gauge comprising an essentially closed auxiliary tank having a liquid inlet near the bottom thereof, liquid conductive means connecting said inlet to a low place of said portion of the power plant to provide a liquid conductive path from said portion to said tank enabling said tank to become hydrostatically filled to the level of liquid in said power plant portion and provide a reservoir of liquid which is not subjected to the same turbulence as the liquid in said portion of the power plant, said tank having an opening at the top thereof, a float arm pivoted to said tank and provided with a float at one end in said tank, the opposite end of said arm projecting through said opening to a position exteriorly of said tank, a group of stationary contacts, means mounting said contacts on said tank adjacent to said opening, a wiper attached to said end of said arm on the exterior of said tank and arranged to wipe across said group of contacts, a remotely located electrical instrument, circuit means operatively connecting said group of contacts, said wiper and said instrument with a source of electric potential, an insulator interposed between said wiper and said opposite end of said float arm, a graduated plate secured to said tank and bridging said tank opening adjacent to said opposite end of said float arm and cooperable with said opposite end of said float arm to provide a visual indication of the position of said float arm in said tank, whereby there are two liquid level indications available at the site of the power plant and remotely respectively.

3. The combination of claim 2 wherein there is a bracket secured to said tank and mounting said tank alongside of the power plant.

4. The combination of claim 3 wherein said tank has a bottom wall provided with a liquid outlet, and a drain plug in said outlet.

5. The combination of claim 2 wherein the power plant is disposed essentially in the engine compartment of a motor vehicle and said remotely located instrument is located within the passenger compartment of the vehicle.

References Cited in the file of this patent

UNITED STATES PATENTS

| | | |
|---|---|---|
| 317,289 | Boyle | May 5, 1885 |
| 564,283 | Hunt | July 21, 1896 |
| 996,170 | Vannatter | June 27, 1911 |
| 1,435,411 | Mitchell | Nov. 14, 1922 |
| 1,634,165 | Williams | June 28, 1927 |
| 1,802,124 | Phifer | Apr. 21, 1931 |
| 2,203,766 | Bear et al. | June 11, 1940 |
| 2,264,219 | Ribbans | Nov. 25, 1941 |
| 2,907,845 | Culley | Oct. 6, 1959 |